(12) United States Patent
Talavasek et al.

(10) Patent No.: US 8,574,012 B2
(45) Date of Patent: Nov. 5, 2013

(54) ELECTRICAL CONNECTOR WITH THREE PORTS AND PASSTHROUGH CONDUCTORS FOR BICYCLE COMPONENTS

(75) Inventors: Jan Talavasek, Knonau (CH); Ian M. Hamilton, San Jose, CA (US); Amber R. Lucas, Lucerne (CH)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/422,735

(22) Filed: Mar. 16, 2012

(65) Prior Publication Data
US 2013/0244463 A1   Sep. 19, 2013

(51) Int. Cl.
*H01R 24/04* (2006.01)
(52) U.S. Cl.
USPC .......................................................... 439/668
(58) Field of Classification Search
USPC ................... 439/668, 669, 372, 349
See application file for complete search history.

(56) References Cited

U.S. PATENT DOCUMENTS

| | | | | |
|---|---|---|---|---|
| 6,835,069 B2 * | 12/2004 | Kitamura et al. | | 439/34 |
| 6,848,930 B2 * | 2/2005 | Fukuda | | 439/349 |
| 7,850,556 B2 * | 12/2010 | Meggiolan | | 474/70 |
| 7,905,736 B2 * | 3/2011 | O'Rourke | | 439/214 |
| 8,029,307 B2 * | 10/2011 | O'Rourke | | 439/372 |
| 2009/0011656 A1 * | 1/2009 | Dal Pra' | | 439/669 |
| 2010/0029140 A1 * | 2/2010 | O'Rourke | | 439/668 |

FOREIGN PATENT DOCUMENTS

| | | |
|---|---|---|
| EP | 1276192 | 10/2004 |
| EP | 1780106 | 5/2007 |
| EP | 1460731 | 8/2007 |

* cited by examiner

*Primary Examiner* — Chandrika Prasad
(74) *Attorney, Agent, or Firm* — Michael Best & Friedrich LLP

(57) ABSTRACT

A bicycle including a frame, an electrical circuit including a power source, and an electrical connector. The electrical connector includes a first port defined by a first terminal that has a first configuration, and a second port defined by a second terminal that has a second configuration complementary to the first configuration. The electrical connector further includes a third port that is distinct from the first and second ports, a plurality of passthrough conductors extending from the first port to the second port to connect the electrical connector to the electrical circuit, and at least one lateral conductor providing an electrical connection from the first port to the third port.

19 Claims, 6 Drawing Sheets

ELECTRICAL CONNECTOR WITH THREE PORTS AND PASSTHROUGH CONDUCTORS FOR BICYCLE COMPONENTS

BACKGROUND

The present invention relates to bicycles, and more particularly to bicycles including electrical connectors for components on the bicycles.

Typically, bicycles are propelled by pedals mounted to a crankset. A typical crankset is equipped with two cranks that each supports a pedal at one end and couples with a spindle adjacent the other end. These cranksets transfer energy exerted on the pedals by a rider to forward motion of the bicycle. The crankset typically includes one or more sprockets that engage a chain to transfer the rotary motion of the crankset to a rear wheel.

Some bicycles, typically referred to as "e-bikes," include electrical components, such as data displays, power supplies, controllers, brake lever switches, electric motors, etc. Some of these components are often mounted on or near the handle bar. For example, existing e-bikes commonly have one master control unit (e.g., the display) with a single cable that is connected to the power supply and the electric motor or controller. Often, a hub is connected to the power supply and/or the control unit to distribute power to the components on the bicycle.

Typically, a bicycle includes several components, so the hubs are provided with a body that includes one input (e.g., for the power cable) and several outputs. A cable or connector is routed from each component to one of the outputs on the hub to electrically connect the components to the power supply. Some components of the bicycle may not connected to the hub because the hub does not have enough outputs available for the quantity of components, or because a connection is not desired. As a result, the cables that are connected to these components dangle freely on the bicycle.

SUMMARY

In some constructions, the present invention provides a bicycle including a frame, an electrical circuit including a power source, and an electrical connector. The electrical connector includes a first port defined by a first terminal that has a first configuration, and a second port defined by a second terminal that has a second configuration complementary to the first configuration. The electrical connector further includes a third port that is distinct from the first and second ports, a plurality of passthrough conductors extending from the first port to the second port to connect the electrical connector to the electrical circuit, and at least one lateral conductor providing an electrical connection from the first port to the third port.

In another construction, the present invention provides an electrical connector including a body that has a first port defined by a first terminal having a first configuration, a second port defined by a second terminal having a second configuration that is complementary to the first configuration, and a third port that is distinct from the first and second ports. The electrical connector also includes a plurality of passthrough conductors extending from the first port to the second port, and at least one lateral conductor that provides an electrical connection from the first port to the third port.

In another construction, the present invention provides a bicycle including a frame, an electrical circuit including a power source, and a plurality of electrical connectors. Each electrical connector includes a body that has a first port, a second port, and a third port. Each first port is connectable with any second port. Each electrical connector also includes a plurality of passthrough conductors extending from the first port to the second port to connect the electrical connector to the electrical circuit, and a lateral conductor that provides an electrical connection from the first port to the third port. The bicycle also includes a first electrical component that is connected to the third port of a first electrical connector of the plurality of connectors, and a second electrical component that is connected to the third port of a second electrical connector of the plurality of connectors. The lateral conductor of the first electrical connector is electrically coupled to at least one of the plurality of passthrough conductors of the second electrical connector.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
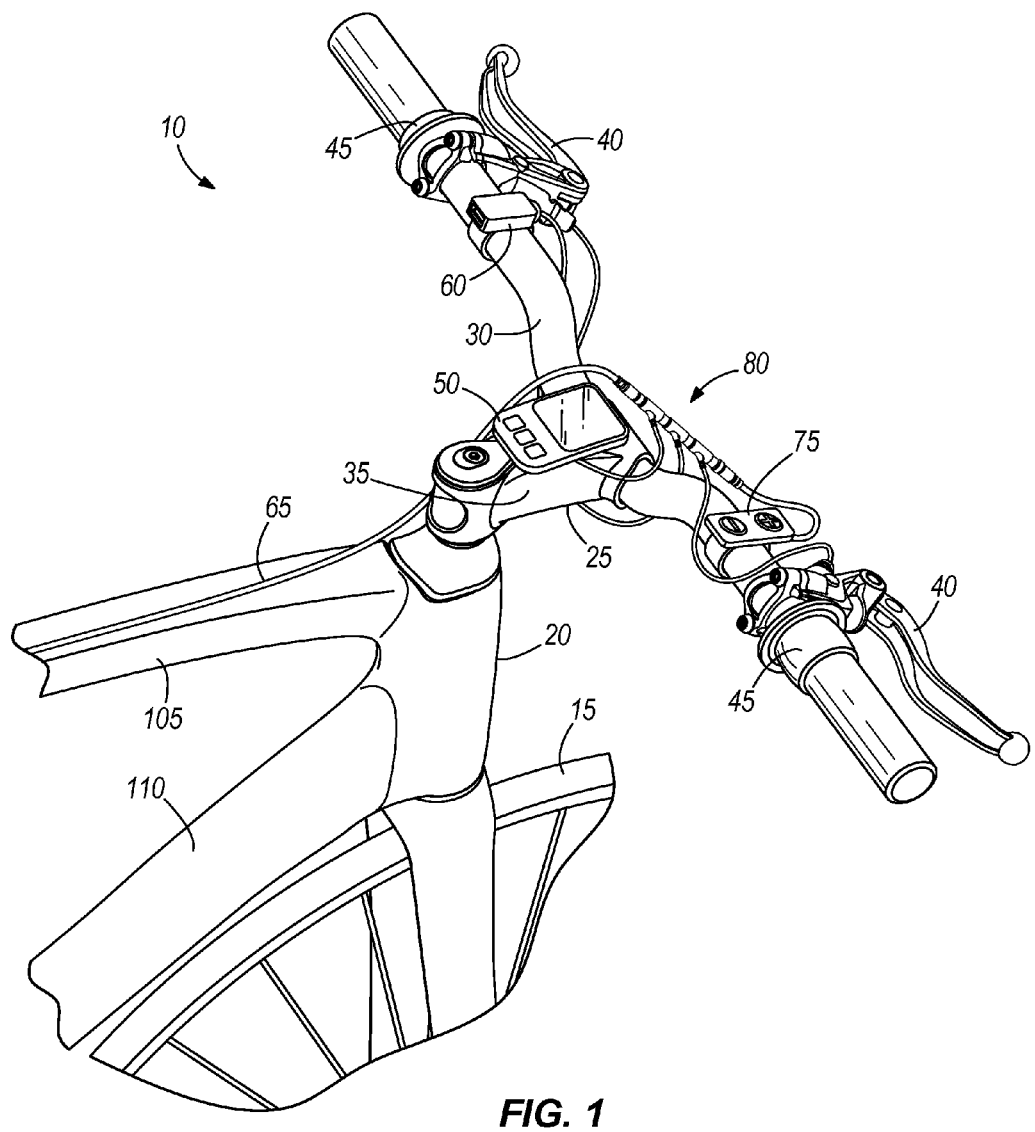
FIG. 1 is a perspective view of a portion of a bicycle including electrical components, an electrical circuit, and a plurality of electrical connectors embodying the present invention.

FIG. 1 illustrates a portion of a bicycle 10 that includes a front wheel 15, a rear wheel (not shown), a frame 20, and a steering assembly 25 that has a handlebar 30 and a stem 35. Brake levers 40 are attached to opposite ends of the handlebar 30 and are connected to respective front and rear brakes (not shown). Each brake lever 40 includes a switch 42 (see FIG. 2) that is closed when the brake lever 40 is actuated. Also, shift levers 45 are coupled to the handlebar 30 and are in communication with respective front and rear derailleurs (not shown).

Figure 2:
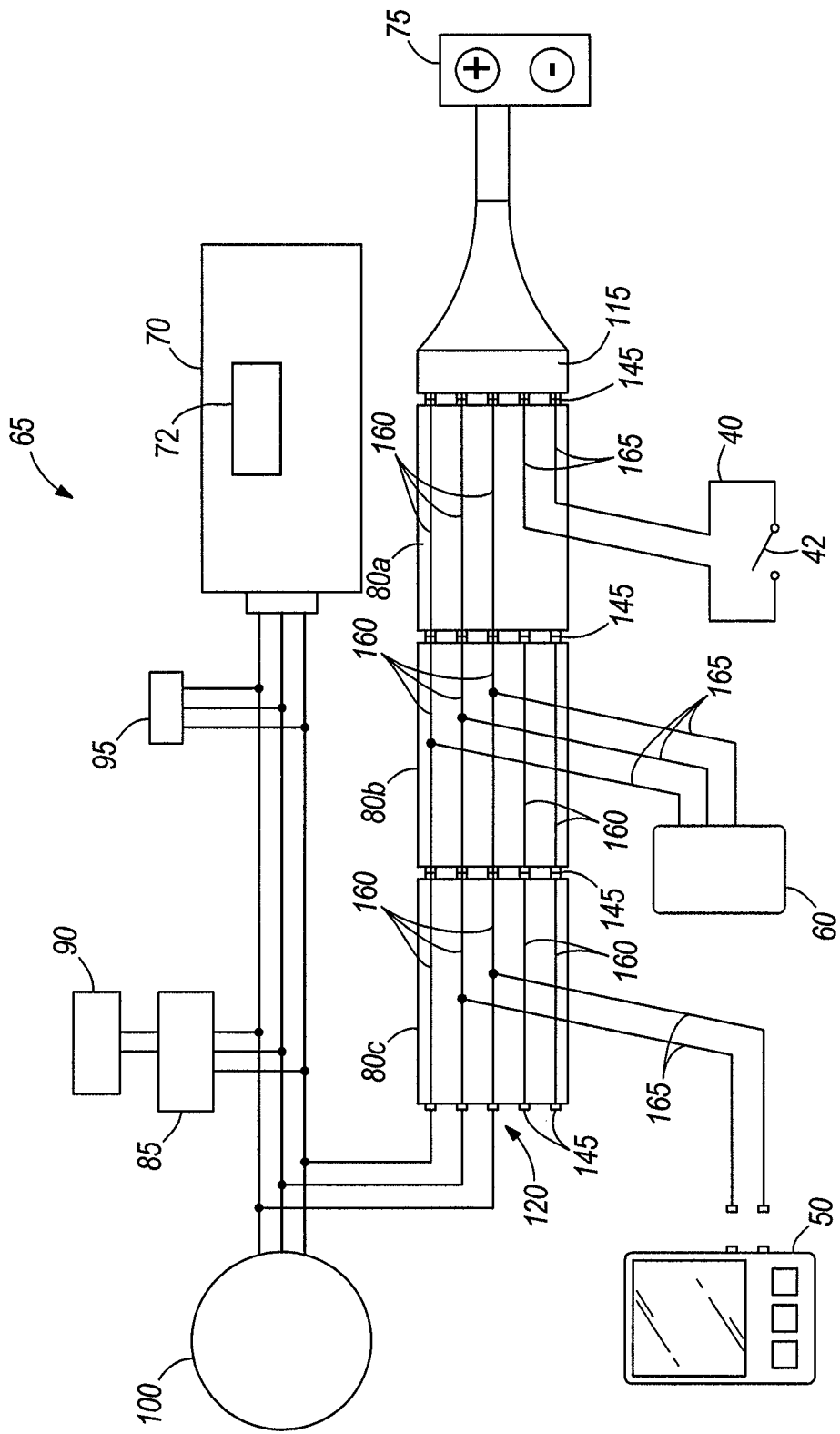
FIG. 2 is a schematic view of the electrical circuit including the electrical connectors connected to the components.

With reference to FIGS. 1 and 2, a computer or data display 50 (e.g., an ANT+ device) is attached to the stem 35 of the bicycle 10, and a USB device 60 is coupled to the handlebar 30. The bicycle 10 also includes an electrical circuit 65 that has a controller 70 with a power source 72 (e.g., battery) coupled to the frame 20, a remote control 75 coupled to the handlebar 30, and a plurality of electrical connectors 80 located between the controller 70 and the remote control 75 that electrically connect the brake levers 40, the display 50, and the USB device 60 to the electrical circuit 65. The USB device 60 can be used, for example to charge other electrical components (e.g., cell phone, music player, etc.) that may or may not be coupled to the bicycle 10.

As illustrated in FIG. 2, the bicycle 10 also can include a front light 85 and a rear light 90 that are electrically connected to the electrical circuit 65 to receive power via the controller 70. A charge port 95 is provided in the frame 20 to allow connection between the controller 70 and an external power source (not shown) so that the controller 70 can be charged. A motor 100 is connected to the electrical circuit 65 to, among other things, act as a generator to provide power to the electrical circuit 65 (e.g., the controller 70, the USB device 60) for charging when one of the brake levers 40 is pulled.

Figure 3:
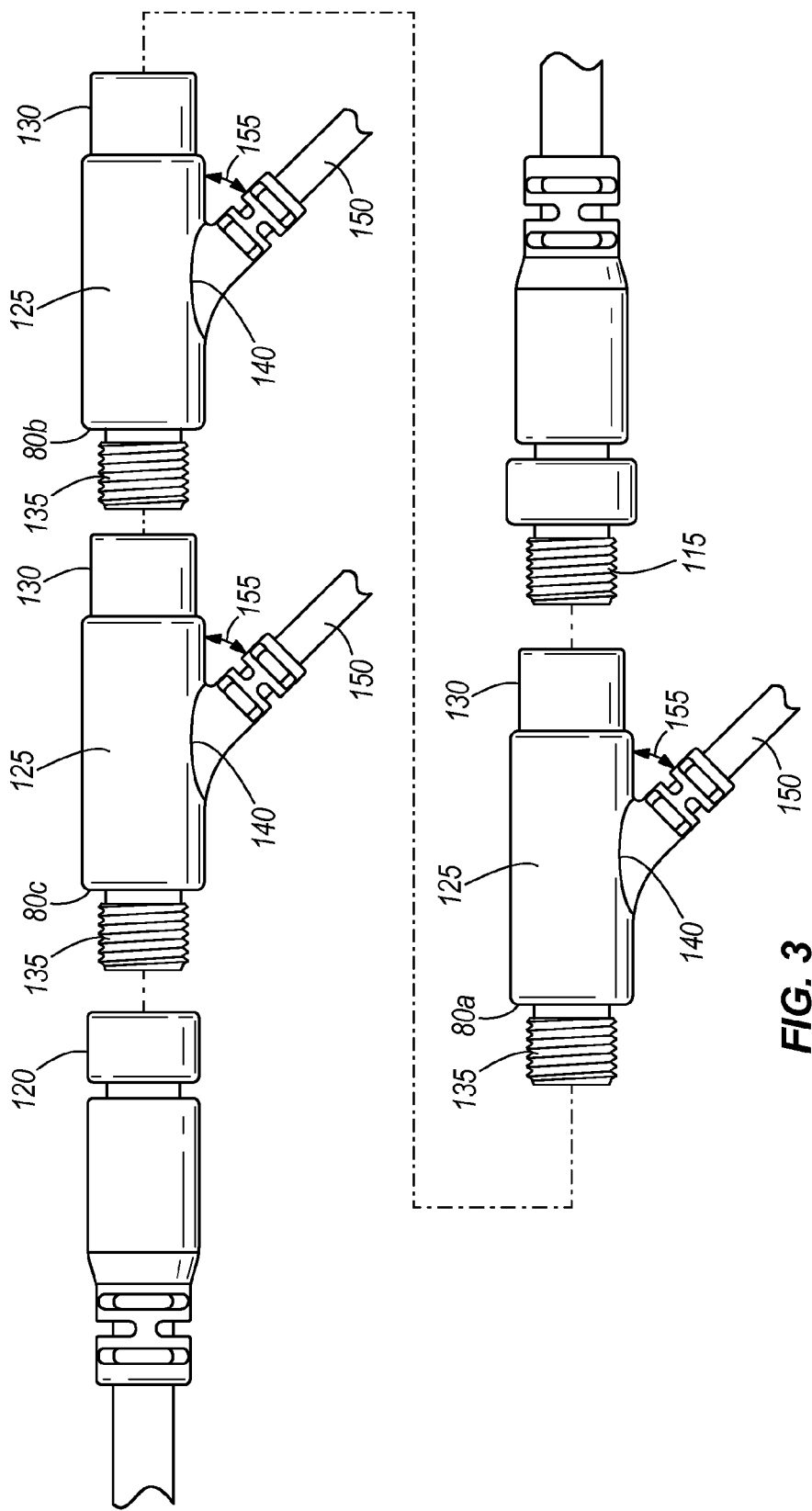
FIG. 3 is an exploded view of the electrical connectors in the electrical circuit.
Figure 4:
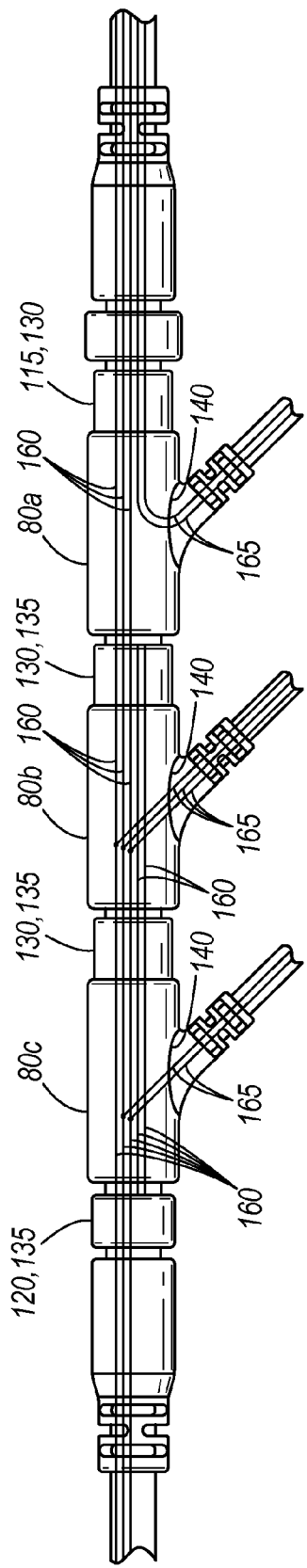
FIG. 4 is a side view illustrating the electrical connectors arranged in a first configuration.
Figure 5:
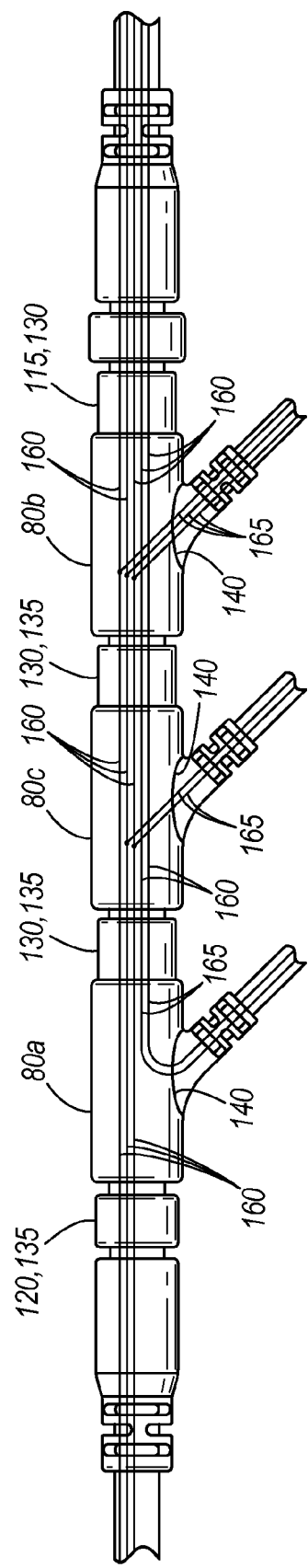
FIG. 5 is a side view illustrating the electrical connectors arranged in a second configuration.

Referring back to FIG. 1, the electrical circuit follows a top tube 105 of the bicycle 10 and the electrical connectors 80 are located in the electrical circuit 65 adjacent the handlebar 30, although the circuit 65 and the connectors 80 can be located at any suitable location (e.g., a down tube 110 of the frame 20, seat tube (not shown), etc.) on the bicycle 10. With reference to FIGS. 3-5, the electrical circuit 65 has a first end terminal 115 on one side of the electrical connectors 80 closest to the remote control 75, and a second end terminal 120 on the other side of the electrical connectors 80 closest to the controller 70.

FIGS. 1-5 show that the electrical circuit 65 includes three electrical connectors 80 (i.e., a first connector 80a, a second connector 80b, and a third connector 80c) that are each associated with a particular electric component (e.g., the brake lever 40, the data display 50, and the USB device 60) on the bicycle 10 and that are connected to each other in an in-line (i.e., series) configuration. For example, with reference to FIGS. 2-4, the first connector 80a is associated with and connected the brake lever 40, the second connector 80b is associated with and connected to the display 50, and the third connector 80c is associated with and connected to the USB device 60.

Each electrical connector 80 includes a body 125 that has a first port 130 that is defined by a first terminal, a second port 135 that is defined by a second terminal, and a third port 140. Generally, each first port 130 has a first configuration that is connectable with any second port 135, which has a second configuration that is complementary to the first configuration. The first terminal is rotatable relative to the body 125 and has internal threads, whereas the second terminal has external threads. The first and second terminals for the connectors 80 may instead include other complementary configurations, such as a plug-and-socket configuration. Also, each first and second terminal includes a set of contacts 145 (e.g., 5 contacts) that are provided in a predetermined arrangement to define a universal connection so that additional connectors 80 can be added to the electrical circuit 65, or so that one or more connectors 80 can be removed from the circuit 65.

Figure 6:
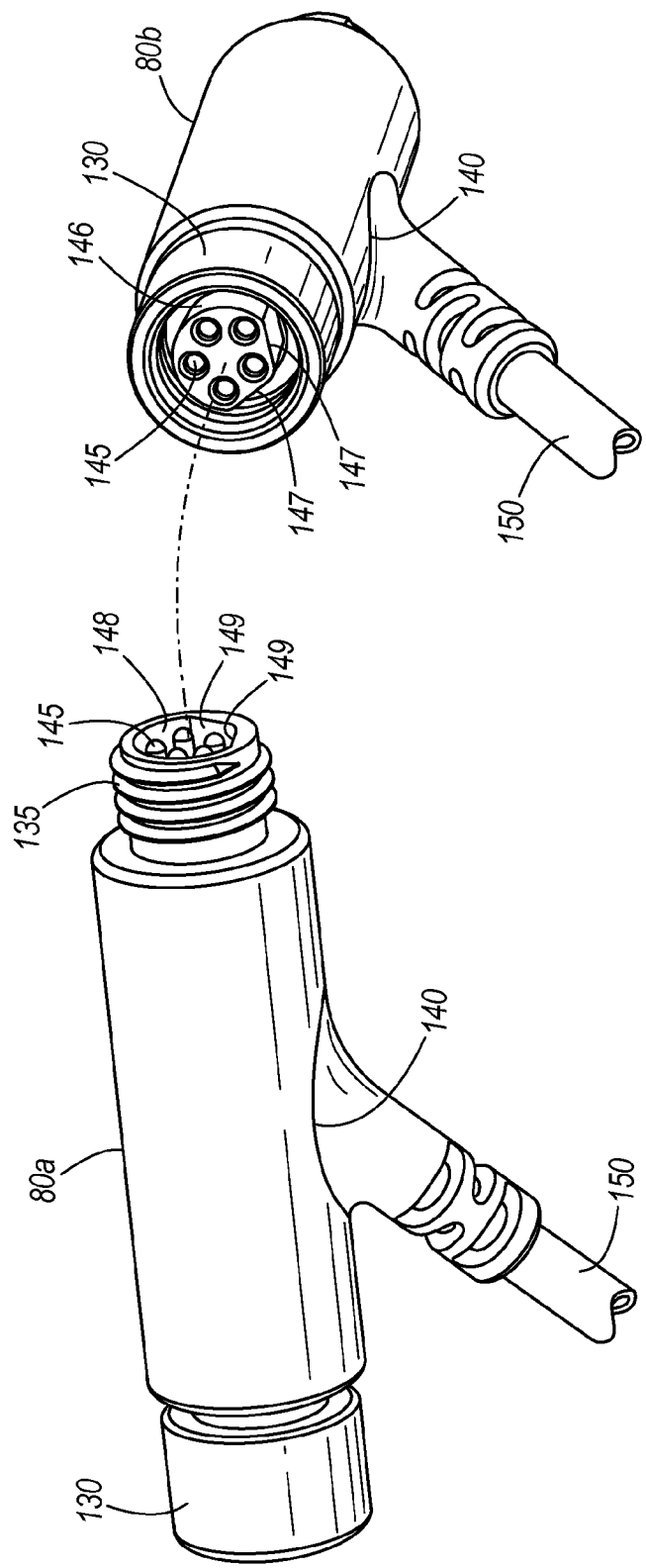
FIG. 6 is an exploded view of two electrical connectors illustrating the connection between the connectors.

FIG. 6 illustrates one example of the predetermined arrangement (i.e., the physical and electrical connection) between two connectors 80. In particular, the first port 130 of the second connector 80b is defined by a socket contact arrangement (e.g., a pentagonal arrangement), and the second port 135 of the first connector 80a is defined by a plug contact arrangement that mates with the socket contact arrangement. The socket contact arrangement of the first port 130 has a curved exterior circumferential surface 146 joined to exterior chamfered or flat surfaces 147 that are located circumferentially next to each other. The plug contact arrangement of the second 135 has a curved interior circumferential surface 148 joined to interior chamfered or flat surfaces 149 that are located circumferentially next to each other.

The exterior circumferential surface 146 of the first port 130 is mated with the corresponding interior circumferential surface 148 of the second port 135. Likewise, the exterior chamfered surfaces 147 of the first port 130 are mated with the corresponding interior chamfered surfaces 149 of the second port 135. The interior and exterior circumferential surfaces 146, 148 and the exterior and interior surfaces 147, 149 cooperate with each other so that the first and second connectors 80a, 80b can be interconnected physically and electrically in only one orientation. The illustrated interconnected arrangement avoids the possibility that the connectors 80 could be connected in such a way that the wrong contacts 145 are in electrical communication with each other.

Also, while FIG. 6 illustrates the predetermined arrangement between the first and second connectors 80a, 80b, it should be apparent that this connection applies to all connectors 80 in the electrical circuit 65 so that the connections are universal among the connectors 80. Further, other physical and electrical arrangements between two connectors 80 that properly align the contacts 145 of the respective connectors 80 to avoid improper electrical connections between the contacts 145 are possible and considered herein.

As shown in FIGS. 2 and 4, the first, second, and third connectors 80a-c are connected to each other in an end-to-end relationship. In particular, the first terminal of the first connector 80a, which is nearest the remote control 75, is coupled to the first end terminal 115. The second terminal of the first connector 80a is coupled to the first terminal of the second connector 80b. In a similar manner, the second terminal of the second connector 80b is coupled to the first terminal of the third connector 80c, and the second terminal of the third connector 80c, which is nearest the controller 70, is coupled to the second end terminal 120 to complete the electrical circuit 65 between the controller 70 and the remote control 75.

The third port 140 is distinct from the first and first and second ports 130, 135. The illustrated third port 140 includes a cable 150 that extends from the body 125 at a location between the first port 130 and the second port 135 to connect the component to the electrical circuit 65. The third port 140 can instead include terminals (e.g., a plug or socket connection, a threaded connection, etc.) in lieu of the cable 150 for connecting the component to the electrical circuit 65.

With reference to FIG. 3, the third port 140 is oriented at a non-zero angle 155 relative to the body 125. More specifically, the angle 155 of the cable 150 relative to the body 125 is approximately 45 degrees. While it is possible and acceptable to orient the cable 150 at a 90 degree angle relative to the body 125, it is preferable that the cable 150 can be oriented at an angle less than 90 degrees (e.g., 30-60 degrees) so that the cable 150 can be generally directed toward the associated component.

With reference to FIGS. 2, 4, and 5, each connector 80 includes a plurality of passthrough conductors 160 that extend from the first port 130 to the second port 135 to connect the electrical connector 80 to the remainder of the electrical circuit 65. The passthrough conductors 160 are typically universal conductors associated with the electrical circuit 65 (e.g., power, ground, bus conductors, etc.), but can also provide specialized signals to be passed through to other connectors that will direct the signal to a third port 140. Each connector 80 also includes lateral conductors 165 that are provided with an electrical connection from the first port 130 to the third port 140 to electrically connect the associated component to the remainder of the electrical circuit 65. For example, the first and third connectors 80a, 80c each include two lateral conductors 165, whereas the second connector 80b includes three lateral conductors 165. The connectors 80 can be provided with any quantity of passthrough conductors 160 and lateral conductors 165 that is necessary to communicate power and signals through the electrical circuit 65 as desired.

With reference to FIGS. 2 and 4, the lateral conductors 165 of the second connector 80b and the third connector 80c are electrically coupled to at least some of the passthrough conductors 160 so that the signal and/or power associated with the passthrough conductors 160 can pass to adjacent connectors 80 and to the remainder of the electrical circuit 65. On the other hand, the lateral conductors 165 of the first connector 80a are electrically isolated from the passthrough conductors 160 because the signal from the brake lever 40 does not need to be shared with other components. Whether the connectors 80 provided in the electrical circuit 65 have lateral conductors 165 that are electrically connected to the passthrough conductors 160 or that are isolated from the passthrough conductors 160 depends on the type of the component being connected and the desired configuration of the electrical circuit 65.

As shown in FIGS. 2 and 4, the first, second, and third connectors 80a-c are placed in the electrical circuit 65 in a first order or arrangement (i.e., from right to left: the first connector 80a (brake lever)—the second connector 80b (display 50)—the third connector 80c (USB device 60)). In this arrangement, two of the passthrough conductors 160 of the second and third connectors 80b, 80c terminate at the first terminal of the second connector 80b and at the second terminal of the third connector 80c. In other words, these two passthrough conductors 160, which are electrically connected between the second and third connectors 80b, 80c, are electrically isolated from the first connector 80a. In fact, in this arrangement, these two passthrough conductors 160 are electrically isolated from all other components and thus provide no useful function.

FIG. 5 shows an alternative, second order or arrangement for the connectors 80 (i.e., from right to left: the second connector 80b (display 50)—the third connector 80c (USB device 60)—the first connector 80a (brake lever)). In this arrangement, the two passthrough conductors 160 of the second and third connectors 80b, 80c that are not associated with the components of the respective connectors 80b, 80c are electrically coupled to the first end terminal 115 and to the first connector 80a. More specifically, the two passthrough conductors 160 extend through the second and third connectors 80b, 80c and electrically couple to the lateral conductors 165 of the first connector 80a so that the signal from the brake lever 40 can be communicated through the second and third connectors 80b, 80c to the remainder of the electrical circuit 65 (e.g., to the display 50, the controller 70, and/or the remote control 75). Because the brake lever 40 signal is unique to the brake lever, there is no need for the lateral conductors 165 of the first connector 80a to be connected to passthrough conductors 160 in the first connector 80a. However, the first connector 80a can include passthrough conductors 160 that are electrically coupled to the lateral conductors 165 so that additional connectors 80 can deliver a similar signal to the remainder of the electrical circuit 65. As can be seen from the above illustration, the electrical circuit for the brake lever 40 will be provided regardless of the order of the three connectors 80a-c.

To add an electrical connector 80 to the electrical circuit 65, a user temporarily decouples one end of the first, second, and third connectors 80a-c from an adjacent terminal. The user then connects the additional connector 80 to the disconnected terminals to complete the electrical circuit 65. To remove an electrical connector 80, the user decouples one or more of the first, second, and third connectors 80a-c from both adjacent terminals, and then attaches the adjacent terminals to each other to complete the electrical circuit 65. Several connectors 80 can be added or removed at the same time without affecting the stability of the electrical circuit 65, and without having to change or redesign the components that remain in the circuit 65.

The electrical connectors 80 provide a modular, plug-and-use apparatus that can be expanded or contracted (i.e., more or fewer connectors 80 in the electrical circuit 65) to accommodate the quantity of electrical components on the bicycle 10 without having unused connectors 80 or cables 150 on the bicycle 10. The passthrough conductors 160 and the lateral conductors 165 in each modular connector 80 provide a universal electrical connection between components so that a user can install the connectors 80 in any order without affecting operation or data transfer on the bicycle 10. Also, the predetermined arrangement of the contacts 145 at each first terminal and second terminal prevents improper electrical connections between adjacent connectors 80 and between the connectors 80 and the first and second end terminals 115, 120.

Various features and advantages of the invention are set forth in the following claims.

What is claimed is:

1. A bicycle comprising:
   a frame;
   an electrical circuit coupled to the frame and including a power source;
   an electrical connector including a first port defined by a first terminal having a first configuration, a second port defined by a second terminal having a second configuration complementary to the first configuration, and a third port distinct from the first and second ports;
   a plurality of passthrough conductors extending from the first port to the second port to connect the electrical connector to the electrical circuit; and
   at least one lateral conductor providing an electrical connection from the first port to the third port,
   wherein the first terminal is rotatable relative to the second terminal.

2. The bicycle of claim 1, further comprising an electrical component coupled to the frame and electrically coupled to the electrical circuit at the third port.

3. The bicycle of claim 1, wherein the bicycle includes a plurality of electrical connectors, and wherein the first terminal of one electrical connector is attached to the second terminal of another electrical connector.

4. The bicycle of claim 3, wherein the plurality of electrical connectors are connected in end-to-end relationship.

5. The bicycle of claim 1, wherein the first terminal includes one of internal and external threads, and the second terminal includes the other of internal and external threads.

6. An electrical connector comprising:
   a body including
      a first port defined by a first terminal having a first configuration,
      a second port defined by a second terminal having a second configuration complementary to the first configuration, and
      a third port distinct from the first and second ports;
   a plurality of passthrough conductors extending from the first port to the second port; and
   at least one lateral conductor providing an electrical connection from the first port to the third port, and
   wherein the lateral conductor is electrically isolated from the plurality of passthrough conductors.

7. The electrical connector of claim 6, wherein the third port comprises a cable.

8. The electrical connector of claim 7, wherein the third port is oriented at a non-zero angle relative to the body.

9. The electrical connector of claim 8, wherein the angle is between about 30 degrees and 60 degrees relative to the body.

10. The electrical connector of claim 6, wherein the at least one lateral conductor is electrically coupled to at least one of the passthrough conductors.

11. The electrical connector of claim 6, wherein the first terminal includes one of internal and external threads, and the second terminal includes the other of internal and external threads.

12. The electrical connector of claim 6, further comprising an electrical component electrically coupled to the third port.

13. The electrical connector of claim 6, wherein the third port is positioned on the body at a location between the first terminal and the second terminal.

14. A bicycle comprising:
a frame;
an electrical circuit coupled to the frame including a power source;
a plurality of electrical connectors, each electrical connector including
a body having a first port defined by a first terminal, a second port defined by a second terminal, and a third port, each first port connectable with any second port,
a plurality of passthrough conductors extending from the first port to the second port to connect the electrical connector to the electrical circuit;
a lateral conductor providing an electrical connection from the first port to the third port;
a first electrical component connected to the third port of a first electrical connector of the plurality of connectors; and
a second electrical component connected to the third port of a second electrical connector of the plurality of connectors,
wherein the lateral conductor of the first electrical connector is electrically coupled to at least one of the plurality of passthrough conductors of the second electrical connector, and
wherein the first terminal is rotatable relative to the second terminal.

15. The electrical connector of claim 6, wherein the lateral conductor of one electrical connector is electrically coupled to at least one of the passthrough conductors of the same electrical connector.

16. The bicycle of claim 14, wherein the plurality of electrical connectors are connected in end-to-end relationship.

17. The bicycle of claim 14, wherein the first terminal has one of internal and external threads, and the second terminal has the other of internal and external threads.

18. The bicycle of claim 14, wherein the third port comprises a cable.

19. The bicycle of claim 18, wherein the cable extends outward from the body at an angle between about 30 degrees and 60 degrees relative to the body.

* * * * *